(12) United States Patent
Vicentini

(10) Patent No.: US 11,473,274 B2
(45) Date of Patent: Oct. 18, 2022

(54) APPARATUS FOR PRODUCING WATER

(71) Applicant: Massimo Vicentini, Camisano Vicentino (IT)

(72) Inventor: Massimo Vicentini, Camisano Vicentino (IT)

(73) Assignee: RONDA HIGH TECH S.R.L., Zane' (IT)

( * ) Notice: Subject to any disclaimer, the term of this patent is extended or adjusted under 35 U.S.C. 154(b) by 194 days.

(21) Appl. No.: 16/497,069

(22) PCT Filed: Mar. 26, 2018

(86) PCT No.: PCT/IB2018/052037
§ 371 (c)(1),
(2) Date: Sep. 24, 2019

(87) PCT Pub. No.: WO2018/173013
PCT Pub. Date: Sep. 27, 2018

(65) Prior Publication Data
US 2021/0113957 A1    Apr. 22, 2021

(30) Foreign Application Priority Data

Mar. 24, 2017  (IT) .................. 102017000032936

(51) Int. Cl.
*E03B 3/28*     (2006.01)
*B01D 53/28*    (2006.01)
(Continued)

(52) U.S. Cl.
CPC .............. *E03B 3/28* (2013.01); *B01D 5/0003* (2013.01); *B01D 5/0075* (2013.01);
(Continued)

(58) Field of Classification Search
CPC .. B01D 53/0438; B01D 53/261; B01D 53/28; B01D 5/0003; B01D 5/0075;
(Continued)

(56) References Cited

U.S. PATENT DOCUMENTS 4,285,702 A * 8/1981 Michel ...................... E03B 3/28
                                                       95/124
5,429,665 A * 7/1995 Botich ................. B01D 53/261
                                                       95/122
(Continued)

FOREIGN PATENT DOCUMENTS

CN    101046101 A    10/2007
CN    202945638 U    5/2013
(Continued)

OTHER PUBLICATIONS

WO2016086751A1_ENG (Espacenet machine translation of Huang) (Year: 2016).*

*Primary Examiner* — Gabriel E Gitman
(74) *Attorney, Agent, or Firm* — Carmel Patent Agency; Robert Ballarini

(57) ABSTRACT

Apparatus for producing water (1) from ambient humidity comprising a heat exchanger (10), comprising a desiccant (11a') of ambient humidity, a solar thermal panel (30) for giving up heat to the heat exchanger (10) and the solar thermal panel (30) being a concentrated one.

11 Claims, 5 Drawing Sheets

(51) Int. Cl.
*F24S 10/70* (2018.01)
*B01D 5/00* (2006.01)
*B01D 53/04* (2006.01)
*B01D 53/26* (2006.01)

(52) U.S. Cl.
CPC ..... *B01D 53/0438* (2013.01); *B01D 53/0462* (2013.01); *B01D 53/261* (2013.01); *B01D 53/28* (2013.01); *F24S 10/70* (2018.05); *B01D 2253/106* (2013.01); *B01D 2257/80* (2013.01); *B01D 2259/4009* (2013.01)

(58) Field of Classification Search
CPC .......... B01D 2253/106; B01D 2257/80; B01D 2259/4009; B01D 53/0462; F24S 10/70; F24S 90/00; E03B 3/28; Y02E 10/44; Y02A 20/00; F24F 3/14; F24F 3/1411
See application file for complete search history.

(56) References Cited

U.S. PATENT DOCUMENTS

| | | | | |
|---|---|---|---|---|
| 5,528,905 | A * | 6/1996 | Scarlatti | B01D 53/229 165/229 |
| 6,336,957 | B1 | 1/2002 | Tsymerman | |
| 2003/0163929 | A1 * | 9/2003 | Vertriest | B01D 53/261 34/80 |
| 2005/0044862 | A1 * | 3/2005 | Vetrovec | A01G 29/00 62/93 |
| 2005/0247201 | A1 * | 11/2005 | Arno | B01D 53/261 96/134 |
| 2010/0170500 | A1 * | 7/2010 | Zillmer | B01D 53/261 126/640 |
| 2011/0138832 | A1 * | 6/2011 | Al-Hadhrami | F24S 21/00 62/468 |
| 2013/0319226 | A1 | 5/2013 | Becze | |
| 2013/0183749 | A1 * | 7/2013 | Aamodt | A61L 2/22 435/287.1 |
| 2013/0291574 | A1 * | 11/2013 | Athalye | F25B 17/08 62/101 |
| 2013/0319022 | A1 * | 12/2013 | Becze | B01D 53/0454 62/271 |

FOREIGN PATENT DOCUMENTS

| | | | | |
|---|---|---|---|---|
| EP | 0678321 | A2 | 10/1995 | |
| JP | S5776824 | U | 5/1982 | |
| JP | S57144829 | A | 9/1982 | |
| WO | 2016086751 | A1 | 6/2016 | |
| WO | WO2016086751 | A1 * | 6/2016 | ............... E03B 3/28 |

* cited by examiner

APPARATUS FOR PRODUCING WATER

TECHNOLOGICAL SETTING

The invention relates to an apparatus and a method for producing water of the type including the characteristics mentioned in the preamble of the independent claim.

TECHNOLOGICAL BACKGROUND

It is known that the problem related to the possibility and capacity to obtain and preserve water reserves has increasingly become a key parameter for defining the liveability conditions of a determined ambient area.

Furthermore, following the continuous population increase that has been recorded on our planet, an increasing need has been identified for making areas habitable that were previously uninhabitable or inhospitable due to not having the essential resources including water (e.g. deserts).

Within the context of this world water requirement, different technological development groups are dedicating resources to developing innovative and economical solutions in order to obtain drinking water from ambient humidity.

A relevant product in this sector of the art is the product A2WH made by AirSolarWater.

The aforementioned product is a stand-alone apparatus comprising a system of thermal solar panels adapted to heat a saline solution or water to temperatures less than 100° C.

Such heated saline solution or water is used as a heat carrier for heating the hygroscopic salts that make the water adsorbed therein slowly evaporate.

Then the evaporated water is condensed in a portion of space that has a lower pressure than ambient pressure in order to lower the dew point.

The mechanical parts used by the apparatus (fans for the circulation of air in the different parts of the apparatus, pump for the circulation of the saline solution, etc.) are powered by a photovoltaic panel integrated into the system.

Such product is however unsuitable for producing high quantities with a high drinking water yield due to the low operating temperatures (generally around 70° C.) which these types of products can reach.

Furthermore, another technological disadvantage is represented by the need to use a vacuum pump system to allow, through slight depression, the dew point of the evaporated water to be lowered, thus allowing its condensation.

DESCRIPTION OF THE INVENTION

The scope of the present invention is that of providing an apparatus and a method for producing water that overcomes one or more of the disadvantages of the prior art identified.

Within this scope, an objective of the invention is to improve the quantity of water produced.

A further object is that of providing an apparatus and a method that allows high exploitation of the heat provided by the solar radiation. Such aims are reached by the invention realised according to the present invention through an apparatus for producing water from ambient humidity comprising a heat exchanger that comprises a desiccant of ambient humidity, and a concentrated solar thermal panel.

It is significant to note that the solar thermal panel allows temperatures much higher than 100° C. to be reached. In these conditions it is possible to make the water contained in the desiccant evaporate very effectively thus eliminating any presence of bacteria or other contaminants.

In this context, the term desiccant indicates a material able to actuate a desiccating process by adsorption. This implies that preferable desiccants are generally hygroscopic materials able to bind molecules of water to themselves in a reversible way.

The aforementioned concentrated solar thermal panel allows a material to be heated locally by a few hundred degrees centigrade.

This characteristic makes it possible to easily heat a heat-transfer fluid to temperatures above 100° C. thus allowing a desorption step to be performed on the water molecules adsorbed by the desiccant more effectively and quickly with respect to known solutions.

According to one embodiment, the concentrated solar thermal panel is parabolic.

Such type of solar thermal panel allows a tube to be placed on the parabolic focal axis on which the solar rays are concentrated thus reaching temperatures much greater than 100° C., hence increasing the efficiency of the water production process from ambient humidity, benefiting from the reduced steric hindrance of the related components.

Preferably, the solar thermal panel is fluid-dynamically connected to a tank so as to allow a thermal storage of the heat-transfer fluid to be realised during the day for night cycles, thus maximising the yield of the plant.

Preferably, the heat exchanger also comprises at least one desiccating element comprising a desiccant, and at least one coil configured so as to circulate a heat-transfer fluid for heating the desiccant.

In this way, the heating of the desiccant in order to produce the desorption of the molecules of water adsorbed is performed in direct contact with the aforementioned desiccant, thus increasing the efficiency of the process.

According to one embodiment, the heat exchanger comprises an inlet opening, an outlet opening, a forward direction of an airflow defined between the inlet opening and the outlet opening, a plurality of desiccating zones that are arranged in succession in the forward direction of the airflow, comprising respective desiccating elements. Preferably, each desiccating zone of the plurality of desiccating zones has a number of desiccating elements that increases in the direction of the airflow.

Such configuration of the heat exchanger allows the effect of the adsorption of water molecules in the desiccant to be optimised without significantly reducing the flow rate of the transiting airflow.

Preferably, the desiccating elements increase in a number determined through a predetermined ratio between the number of desiccating elements of one desiccating zone and the following one.

It is noted that by increasing the number of desiccating elements and the capacity of the solar collector, the performance of the plant increases and therefore the corresponding litres of water that can be produced per day.

In this way, a plurality of passage channels is realised for the air transiting according to transverse directions to the forward direction of the flows between the inlet and outlet opening of the heat exchanger, reducing load losses to a minimum and therefore the power of the fan adapted to create the airflow hitting the material.

Preferably, the apparatus for producing water comprises a first heat exchanger and a second heat exchanger, an ejector that is fluid-dynamically connected between and to the first and second heat exchangers such that, whilst the first heat exchanger or the second heat exchanger produces aqueous vapour, this aqueous vapour passes inside a main duct of the ejector in the form of a motor flow and producing a depression in the second or first heat exchanger, respectively.

Thanks to this technical solution it is possible to ensure that the depression produced by Venturi effect in the ejector following the passage of the aqueous vapour produced by one heat exchanger in the form of a motor flow, attracts back into the ejector itself air from the exchanger that is not releasing aqueous vapour.

In this way, spontaneous air circulation is produced in one exchanger which thus allows the desiccant that is not releasing aqueous vapour to be hydrated.

According to one embodiment, the desiccant comprises silica gel.

In fact, the Applicant has verified that silica gel represents the best compromise between the hygroscopic effect during the adsorption step and the yield of water during the desorption step in terms of absence of hysteresis and uptake rate and release of water molecules.

Preferably, the at least one coil defines an element for supporting the desiccating element.

In this way, it is possible to confer a double function to the coil which locally supports the desiccating element and at the same time provides it with the heat necessary for activating the desorption process of the water molecules.

Furthermore, such technical solution implies a further reduction in the steric bulk of the heating elements.

According to one embodiment, the desiccating element comprises a non-woven fabric container that is provided to contain the desiccant.

Thanks to this technical solution, the desiccant is contained inside the contained in a stable and safe way having, at the same time, an excellent adsorption and desorption process of water molecules from the air transiting inside the heat exchanger as a result of the holes provided in the non-woven fabric container.

Advantageously, the apparatus for producing water from ambient humidity comprises a photovoltaic panel that allows all the electrical and/or electronic components to be powered. In this case, the apparatus is defined as being stand-alone.

Such condition is clearly very interesting and represents a notable industrial advantage as it allows the aforementioned apparatus to be used absolutely independently without the need for any further electrical connection.

Furthermore, as previously mentioned, the use of concentrated solar thermal panels allows temperatures of the heat-transfer fluid much greater than 100° C. to be reached, thus allowing performance levels and water evaporation efficiencies that are very high and that can also produce evaporated water condensation in standard ambient conditions avoiding the problem of having to apply a depression to the system in order to lower the dew point of the water to have a sufficiently high water condensation yield.

Alternatively, the use of the ejector allows cooling to be produced by mixing the aqueous vapour that promotes its spontaneous condensation.

Based on further aspects, the present invention also relates to a method for producing water from ambient humidity comprising circulating air comprising humidity in a heat exchanger, which comprises a desiccant that is able to retain some of the ambient humidity contained in the circulating air, heating a first heat-transfer fluid circulating in the heat exchanger to a temperature above 100° C. by means of the solar thermal panel, evaporating aqueous vapour from the desiccant at a temperature above 100° C., condensing in the liquid state the evaporated aqueous vapour on a wall comprised in the heat exchanger in standard ambient pressure conditions.

Furthermore, thanks to the use of the tank having heat storage functions, the apparatus for producing water is also able to work for more than twenty-four hours, thus increasing the hydration yield during the night-time hours by temperature inversion.

In this way it is possible to realise a method that allows pure water to be obtained through condensation under standard pressure conditions by adsorbing molecules of water from the ambient humidity contained in air circulating in a heat exchanger.

Preferably, the aforementioned method comprises circulating air comprising humidity in the heat exchanger for a period of less than or equal to half an hour, evaporating water from the desiccant for a period of less than or equal to half an hour, and completing all the operations previously described as relative to the aforementioned method within an hour.

According to one embodiment, the total cycle consists of two half cycles each lasting half an hour.

Thanks to this technical solution it is possible to program the apparatus for a daily quantity of water and evaluate its coverage according to the daily requirement identified.

BRIEF DESCRIPTION OF THE DRAWINGS

The characteristics and advantages of the invention will become clearer from the detailed description of an embodiment illustrated, by way of non-limiting example, with reference to the appended drawings wherein.

DETAILED DESCRIPTION OF A PREFERRED EMBODIMENT OF THE INVENTION

Figure 1:
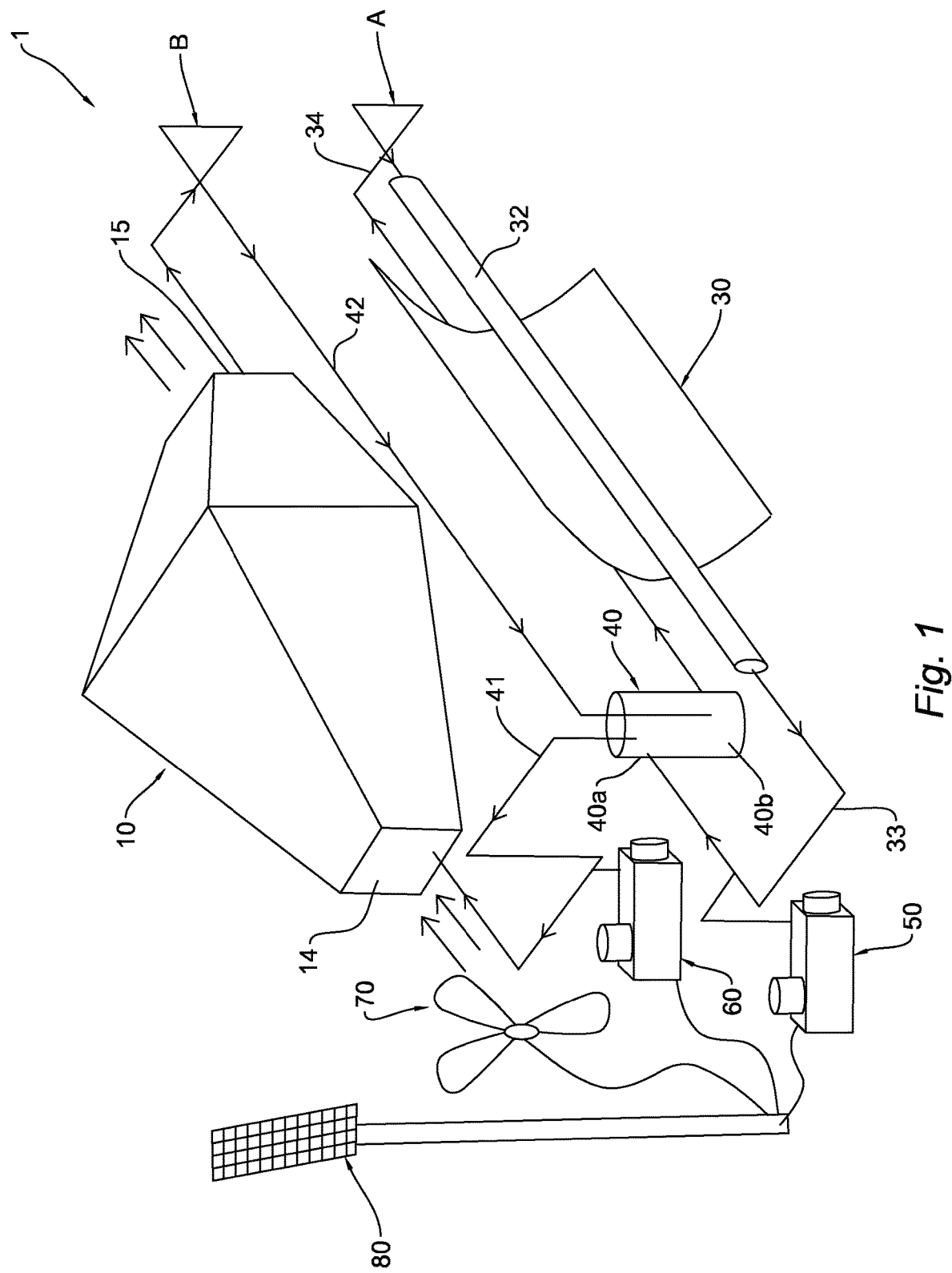
FIG. 1 is a schematic representation of an apparatus for producing water.
Figure 2:
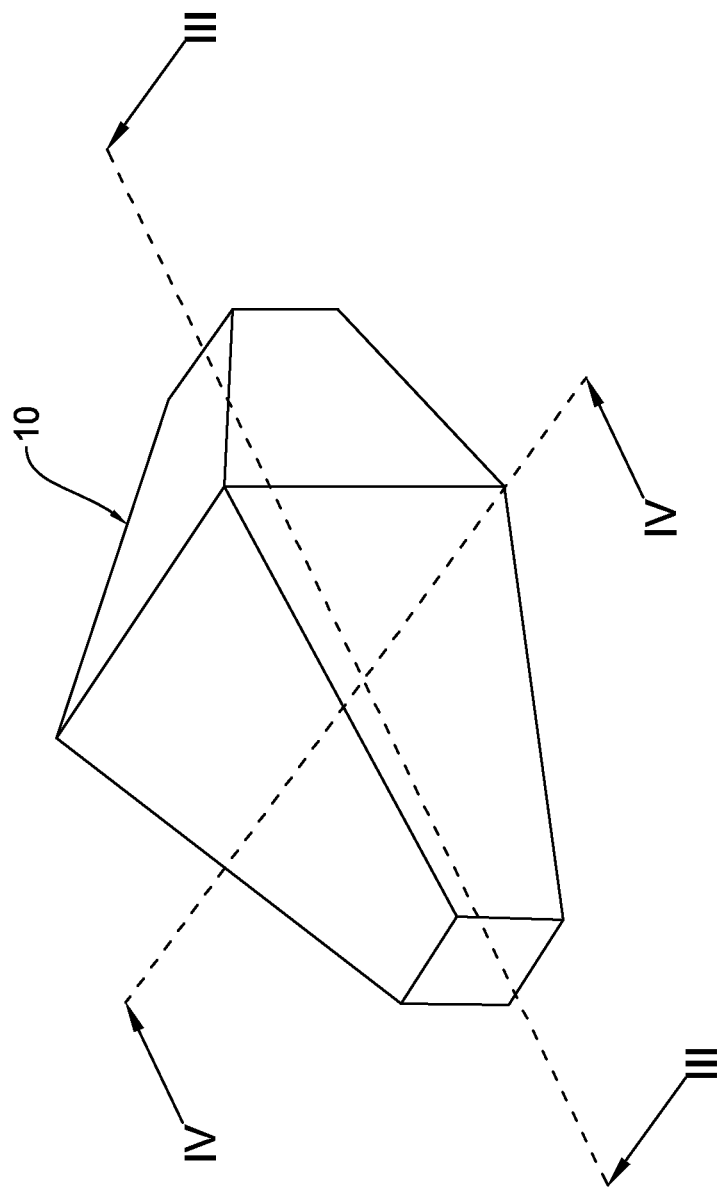
FIG. 2 is a perspective view of a heat exchanger.

In FIG. 1, the number 1 indicates overall an apparatus for producing water from ambient humidity.

The invention realised according to the embodiments of the present invention allows drinking water to be produced with high purity and free from bacteria or other contaminants.

Furthermore, the aforementioned invention is able to operate correctly in environments having ambient humidity comprised between 10 and 100%.

As illustrated schematically in FIG. 1, the apparatus for producing water 1 according to the present invention comprises a first heat exchanger 10, whose characteristics will be described in more detail below and a concentrated solar thermal panel 30, thermally coupled to the exchanger 10 for giving up heat thereto.

In a preferred embodiment, the apparatus for producing water 1 comprises a desiccant 11$a'$ of ambient humidity.

In the context of the present invention and as will be illustrated in greater detail below, the term concentrated solar panel refers to a reflecting panel, or to a system of panels, wherein the solar radiation is concentrated towards a receiving tube inside which a heat-transfer fluid is contained. Typically, concentrated solar panels allow the heat-transfer fluid to be heated to extremely high temperatures, even above 600° C.

With reference to FIG. 1, according to one embodiment, the concentrated solar thermal panel 30 is parabolic, i.e. a reflecting portion of the panel extends according to a geometric parabola.

Such type of solar thermal panel 30 allows a focal axis to be identified, at which a receiving tube 32 is located which, in light of its positioning in the present embodiment, will also be indicated as a focal tube 32. Thanks to the shape of the solar thermal panel 30 it is therefore possible to concentrate the incident solar rays towards the focal tube 32.

Still with reference to FIG. 1, it is possible to identify a first thermal circuit A which comprises the focal tube 32, a storage tank 40, a first tubular fitting 33 and a second tubular fitting 34 intended for the circulation of a first heat-transfer fluid.

Preferably, the heat-transfer fluid is water, diathermic oil, glycol, triethylene glycol, mixtures of molten salts or similar fluid materials able to effectively transfer the heat collected by the focal tube 32 to the tank 40 also at temperatures comprised between 100 and 600° C.

Preferably, the first thermal circuit A is coupled to a second thermal circuit B, intended to give up the heat provided to the thermal fluid through the solar panel 30 and stored in the tank 40 for supplying it to the exchanger 10.

For that purpose, the circuit B may comprise a heat exchange stretch 40a extending inside the tank and a coil 12, schematically illustrated in FIG. 1, comprised in the first heat exchanger 10, i.e. that extends inside it.

As illustrated in the figure, the stretch 40a and the coil 12 are connected through further tubular fittings 41, 42. Preferably, in the second thermal circuit a heat-transfer fluid circulates, the same as the first heat-transfer fluid. According to one embodiment, the first heat-transfer fluid is circulated in the first thermal circuit A through a first pump 50 and the second heat-transfer fluid in the circuit B through a second pump 60.

Advantageously and for management and functional practicality purposes, the first heat-transfer fluid and the second heat-transfer fluid are the same heat-transfer fluid.

It will however be appreciated that the apparatus according to the present invention can operate by means of a single thermal circuit or different thermal circuits from those described above.

It is to be noted that the head required for the first and/or the second pump is substantially contained and the energy required may be simply obtained through a photovoltaic solar device 80 for producing electrical energy and a battery connected thereto with which all the electrical and/or electronic components of the apparatus 1 are powered.

As illustrated previously, it is possible to circulate inside the first heat exchanger 10 a heat-transfer fluid having a temperature over 100° C.

Preferably, the heat-transfer fluid circulating inside the coil 12 has a temperature equal to about 130° C.

Figure 4:
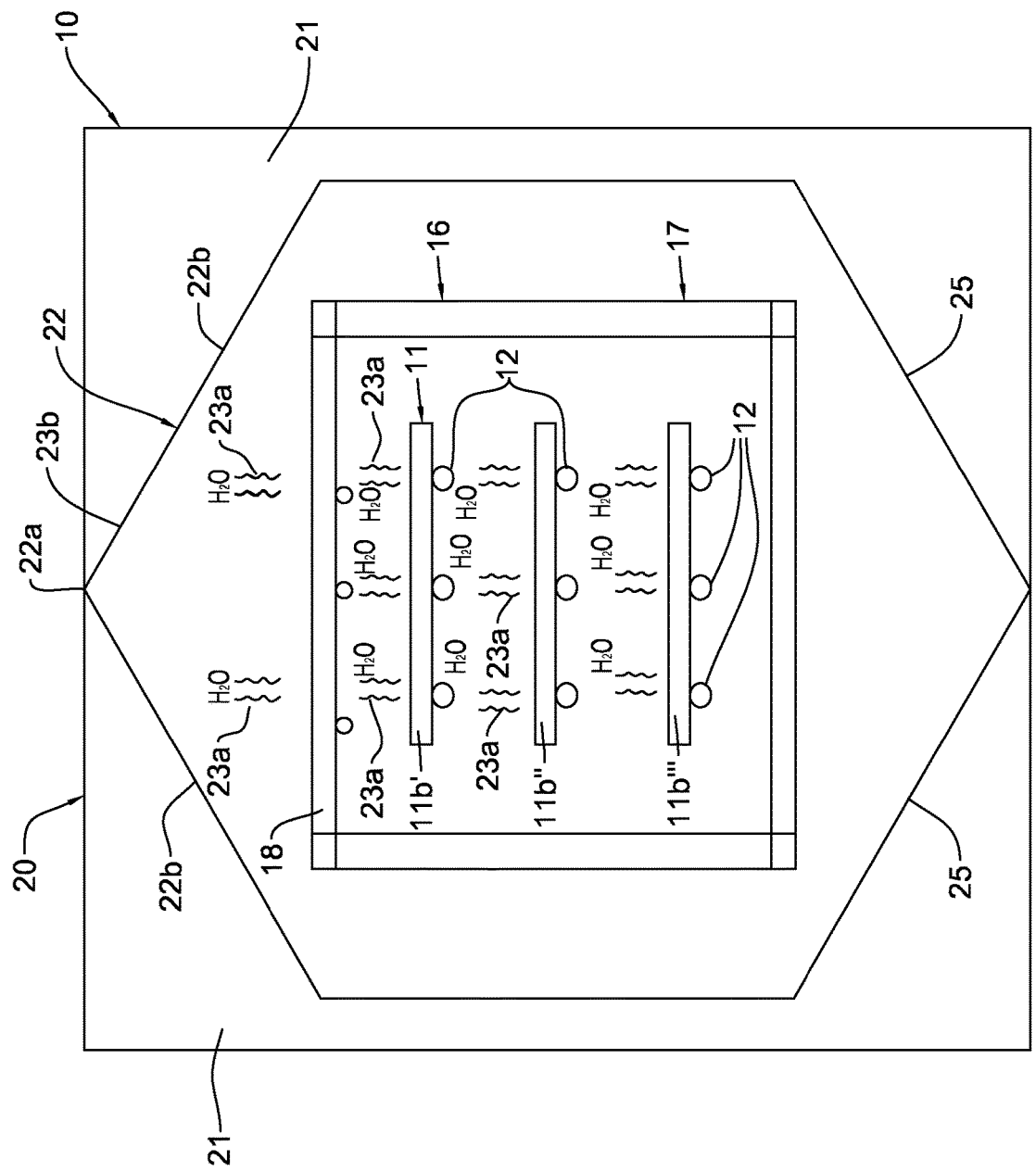
FIG. 4 is a front view of section IV of the first heat exchanger of FIG. 2

With reference to FIG. 4, the coil 12 is preferably positioned adjacent to the desiccating element 11.

Advantageously, the coil 12 can also define an element for supporting the desiccating element 11.

In this way, the coil performs the double function both of heating the desiccating element 11 and of supporting the desiccating element 11 inside the adsorption and desorption chamber 16.

According to a preferred embodiment, the desiccant comprises 11a' silica gel.

The Applicant has verified that silica gel is able to adsorb and desorb ambient humidity very effectively and quickly without having significant hysteresis in the repetition of cycles.

This implies the advantage of being able to repeat a high number of times the adsorption and desorption operations maintaining the performance levels of the desiccant 11a' constant.

For simple containment purposes, the desiccating element 11 can comprise a non-woven fabric container inside which the silica gel is housed or, possibly, desiccating material 11a' of another kind.

The non-woven fabric container allows the desiccant 11a' to be retained effectively inside it and at the same time allows effective transpiration through its holes present in the structure during the adsorption and desorption steps.

In any case, it is clear that different configurations of the desiccating element 11, of the desiccant 11a' and of the coil 12 inside the first heat exchanger 10 may also be provided.

More generally, the first heat exchanger 10 will comprise the desiccating element 11 and coil 12 arranged so as to circulate the heat-transfer fluid for heating the desiccating material 11a'. With reference to FIG. 4, the first heat exchanger 10 preferably comprises an outer casing 20, an inner casing 22 and an adsorption and desorption chamber 16 delimited by a plurality of walls 17 housed inside the inner casing 22.

According to one embodiment, the inner casing 22 comprises a plurality of condensation surfaces 22b, on which to condense aqueous vapour 23a.

Preferably, the condensation of the aqueous vapour 23a takes place through cooling at substantially standard pressure (about 1 atm equal to 101325 pascal).

According to one embodiment, the plurality of walls 17 comprises an upper wall 18 that allows the adsorption and desorption chamber 16 to be placed in fluid-dynamic communication with the inner casing 22.

According to one embodiment, represented in FIG. 4, a gap 21 is identified and interposed between the outer casing 20 and the inner casing 22.

Advantageously, in the gap 21 it is possible to circulate ambient air through a fan 70.

In the same way in which the upper portion of the adsorption and desorption chamber 16 is identified, an upper zone of the inner casing 22 is identified towards which the aqueous vapours, when the aforementioned adsorption and desorption chamber 16 and the inner casing 22 are placed in fluid-dynamic connection, tend to move.

Such upper zone of the inner casing 22 preferably comprises the plurality of condensation surfaces 22b (preferably converging onto an upper apex 22a). In this way, the hot aqueous vapours produced in the adsorption and desorption chamber 16 meet, moving upwards, the plurality of condensation surfaces 22b which are maintained at ambient temperature through heat exchange with the air circulating in the adjacent gap 21.

As a consequence of cooling on the plurality of condensation surfaces 22b, the aqueous vapour 23a condenses into water 23b which can be easily collected in ducts or containers provided.

It will also be appreciated that a vapour generating device may be provided, which can make additional vapour flow to the desiccating elements 11. In one embodiment, the heat generating device is realised through a water tank that is heated by means of the same concentrated solar thermal panel 30. A vapour flow thus generated hits the desiccating elements, hence obtaining the condensation of the humidity contained inside the desiccant. In this case, it is possible not to provide the coils 12 for heating the desiccating elements.

With reference to FIG. 4, the plurality of walls 17 of the adsorption and desorption chamber 16 comprises heat insulating material in order to thermally insulate it.

Preferably, the walls 17 comprise glass wool as a heat insulating material.

The airflow inside the first heat exchanger 10 takes place through an inlet opening 14 and an outlet opening 15, a forward direction of an airflow being defined between the inlet opening 14 and the outlet opening 15, a plurality of desiccating zones 10a, 10b, 10c, 10d that are arranged in succession in the forward direction of the airflow comprising respective desiccating elements 11.

For the purpose of promoting a constant airflow inside the exchanger, the apparatus can comprise a fan 70, preferably placed at the opening 14 so as to create a constant airflow entering into the first heat exchanger 10 through the inlet opening 14.

Figure 5:
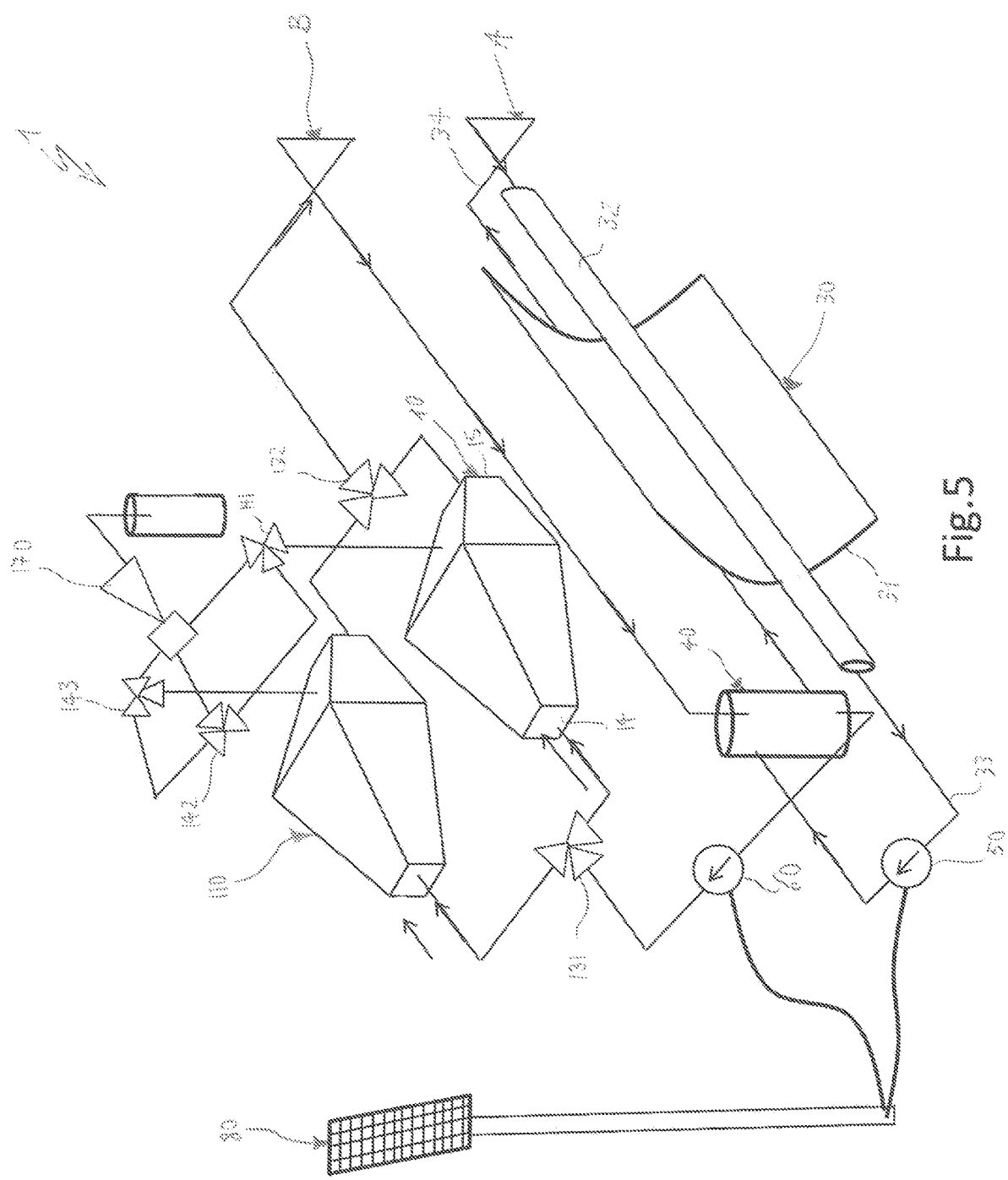
FIG. 5 is a schematic representation of an apparatus for producing water comprising a first and a second heat exchanger.

Also the fan 70 can be advantageously powered through the aforementioned photovoltaic solar panel 80. With reference to FIG. 5 and according to an alternative embodiment, the apparatus for producing water 1 comprises the heat exchanger 10 (also known as first heat exchanger 10), a further heat exchanger 110 (also known as second heat exchanger 110), and an ejector 170 fluid-dynamically connected between and with the first and the second heat exchanger 10, 110.

Thanks to this configuration, while the heat exchanger 10, or the further exchanger 110 produces aqueous vapour through the heating induced by the coil, this aqueous vapour passes inside a main duct of said ejector 170 in the form of a motor flow and produces a depression by Venturi effect in the heat exchanger 110 or 10, respectively.

Preferably, the first or the second heat exchanger 10, 110 are selectively and fluid-dynamically connected to the ejector 170 at the aforementioned depression zone. In this way, by opening an opening provided in the exchanger in which the heat-transfer fluid is not circulating (which is therefore not releasing aqueous vapour), it is possible to circulate ambient air inside it which is attracted by the depression produced by the ejector by Venturi effect.

FIG. 5 shows an example of a plurality of valves 131, 132, 141, 142, 143 which allow the ejector 170 to be connected between and to the first heat exchanger 10 and the second heat exchanger 110, selectively defining which aqueous vapour at the outlet from the first or from the second heat exchanger 10, 110 enters the main duct of the ejector 170 in the form of a motor flow, and at the same time, which heat exchanger is connected in the depression zone of the ejector 170 ensuring that the air contained in the latter heat exchanger is sucked by depression.

In this case, a further energy advantage is realised since the circulation of the humid ambient air in the first or in the second heat exchanger 10, 110 does not take place through the use of the fan 70 (which however implies a consumption of electrical current) but through the Venturi effect produced by the aqueous vapour passing through the ejector 170.

In the case of using the aforementioned first and second heat exchanger 10, 110, the condensation of the aqueous vapour preferably takes place by cooling following mixing with the ambient air attracted into the ejector through the Venturi effect.

It is therefore clear that in this case, the first and the second heat exchanger 10, 110 do not need to have the gap zone 21 for realising the aqueous vapour condensation step.

Also preferably, the condensation of the water may be optimised through the use of a centrifugal filter (not shown in the figure) placed downstream of the ejector 170 that allows the water condensed to be separated from the gas present through the centrifugal action and as a function of the different densities.

According to the aforementioned embodiment, the condensed water is collected in said portion placed downstream of the ejector and of the centrifugal filter, while the separated gas is transferred by the centrifugal filter through a different conduit from the one used for collecting the water thus produced.

In this way, the apparatus 1 for producing water is stand-alone, i.e. it can realise its functions without needing any connection to external structures or supplies.

Figure 3:
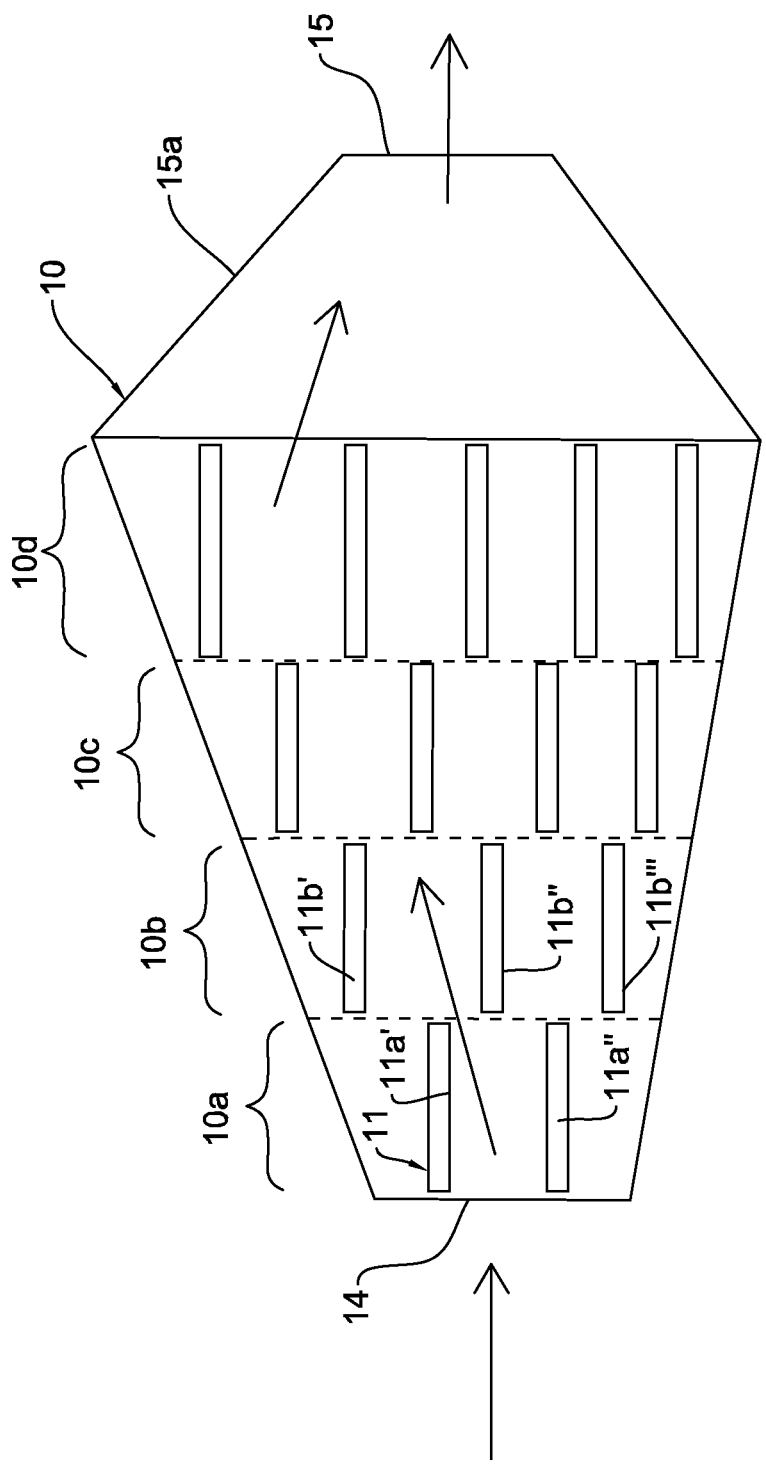
FIG. 3 is a lateral view of section III of the first heat exchanger of FIG. 2.

With reference to FIG. 3, each desiccating zone of the plurality of desiccating zones preferably has a number of desiccating elements 11 that increases in the forward direction of the airflow.

This configuration allows an ideal minimum load loss of the system to be obtained.

According to one embodiment, the absorption and desorption chamber 16 comprises four sequential desiccating zones 10a, 10b, 10c, 10d along the forward direction of the airflow.

Preferably, a first desiccating zone 10a comprises two desiccating elements 11a', 11a", a second desiccating zone 10b comprises three desiccating elements 11b', 11b", 11b''', a third desiccating zone 10c comprises four desiccating elements, a fourth desiccating zone 10d comprises five desiccating elements.

Still with reference to FIG. 3, the desiccating elements 11 comprised in one zone are housed according to a cascade arrangement with respect to those of the previous zone.

Preferably, second desiccating elements 11b' comprised in a second desiccating zone 10b of the plurality of desiccating zones 10a, 10b, 10c, 10d are housed in cascade with first desiccating elements 11a', comprised in a first desiccating zone 10a of the plurality of desiccating zones 10a, 10b, 10c, 10d with respect to the airflow.

In this context, the cascade arrangement identifies an arrangement of the desiccating elements 11 so that an airflow interacting with a surface of a desiccating element of a desiccating zone is in the following desiccating zone being able to interact with a number of surfaces greater than or equal to that of the previous zone.

It is also to be noted that an airflow, e.g. the flow comprised between the two desiccating elements 11a' and 11a" and interacting with a surface of the desiccating element 11a' will have the possibility to interact with two surfaces, respectively one of 11b' and another of 11b", in the second desiccating zone 10b (as indicated by the arrow shown).

In this way, the number of surfaces interacting with the flow can be increased without having to excessively increase the total load loss of the first heat exchanger 10.

According to one embodiment, a desiccating element 11 of a desiccating zone is placed about half way between two desiccating elements of the following desiccating zone.

In an alternative embodiment, although the aforementioned cascade arrangement is not adopted, the desiccating elements of one desiccating zone are arranged staggered with the desiccating elements of the desiccating zones adjacent thereto. In this way, the airflow comprising ambient humidity is deviated with respect to an inlet-outlet direction defined between the inlet opening 14 and the outlet opening 15.

Also in this case, a desiccating element 11 of a desiccating zone may be placed about half way between two desiccating elements of the following desiccating zone.

Downstream of the desiccating zones, there is preferably a restriction 15a of the section of the first heat exchanger 10 which ends in the outlet opening 15.

Preferably, the desiccating elements 11 are inclined with respect to the airflow forward direction so as to maintain a laminar trend of the flows on the surfaces of the desiccating elements and compensate for the impoverishment of water molecules that takes place during the adsorption process on the surface as envisaged by the boundary layer theory.

The operating modes of the apparatus for producing water 1 from ambient humidity, defining the method according to the present invention, comprise the operations reported below.

Air comprising humidity is circulated in the first heat exchanger 10 and, thanks to the presence of the desiccating material 11a' some of the ambient humidity contained in the air is retained.

Through the concentrated solar thermal panel 30 the first heat-transfer fluid is heated to a temperature over 100° C.

The two operations can be performed simultaneously thanks to the presence of a storage tank 40. When the desiccating material 11a has absorbed sufficient humidity, the first heat-transfer fluid is circulated, heating the coil 12 and obtaining the consequent evaporation of the water contained in the desiccating material 11a'.

Preferably, the temperature of the first heat-transfer fluid at the coil 12 is around 130° C.

Then, the aqueous vapour 23a obtained through the aforementioned evaporation process is condensed by cooling thus obtaining water in the liquid state.

It is important to note that such water, being obtained by evaporation and subsequent condensation, is free from impurities or other types of pollutants and therefore suitable for drinking and for various different uses.

Preferably, the aforementioned method comprises condensing the evaporated aqueous vapour either by cooling on a wall comprised in the first heat exchanger 10 in standard ambient pressure conditions (equal to about 1 atm) or by cooling through mixing with air at a temperature lower than said aqueous vapour temperature in a portion placed downstream of an ejector 170.

Also preferably, the condensation of the water can be optimised through the use of a centrifugal filter (advantageously comprising a lamella clarifier) which allows the condensed water to be separated from the mixed gas through centrifugation.

According to one embodiment, the method envisages collecting the water in a container.

For the purpose of collecting the condensed water, the first heat exchanger 10 and the second heat exchanger 110 can preferably have a lower funnel-shaped portion 25.

Advantageously, the first heat-transfer fluid is a gas. Preferably, the gas used as the first heat-transfer fluid is, at least partially, the one circulated previously in the first heat exchanger 10 in order to collect the humidity contained therein through the desiccating elements 11.

According to one embodiment, the present method comprises realising a cyclic process wherein:

During night-time hours, air comprising humidity is circulated in said first heat exchanger 10, During daytime hours, through the solar thermal panel 30, preferably concentrated, a first heat-transfer fluid circulating in the first heat exchanger 10 is heated to a temperature over 100° C.

Evaporating Aqueous vapour from the desiccant 11a',

Condensing the evaporated aqueous vapour by cooling obtaining water in the liquid state and collecting the water in a container. Preferably, all the adsorption and desorption operations of water in the desiccant 11a' previously described are completed within twenty-four hours.

The management of the two aforementioned night-time and daytime steps of the present method can be handled by a simple processing unit (not shown in the figures) which allows the operations performed by the first and second pump 50, 60 to be managed and programmed.

According to a further example, in one embodiment of the aforementioned method, it is possible for air comprising ambient humidity to be circulated in the first heat exchanger 10, and therefore absorb humidity, for a period of at least half an hour.

Preferably, the air can be circulated for longer than one hour.

In this way, the desiccant 11a' is put in the conditions for being able to adsorb water molecules within it (if it is not already saturated).

Then, aqueous vapour is evaporated from the desiccant 11a' for a period preferably equal to half an hour.

Preferably, all the adsorption and desorption operations of water in the desiccant 11a' previously described are completed within one hour. Advantageously, such operations are repeated numerous times over the course of twenty-four hours. Such operating mode allows the production of water on a daily basis to be planned and therefore to have an expectation of predictable and reproducible production possibilities. The final user will have the possibility to define the water adsorption and desorption steps according to their specific requirements.

Preferably, the water produced according to one embodiment of the present method can be used in aeroponic greenhouses.

According to one embodiment, the method comprises the step of inserting or dissolving salts in the water produced. Advantageously, such salts are calcium, magnesium, bicarbonate, etc. Preferably, such technical solution is performed by dissolving granular salts in the water or by, at least partially, immersing massive pieces of rock (e.g. Dolomite, etc.) in the water produced, which perform slow release of salts into the water itself.

The invention claimed is:

1. An apparatus for producing water (1) from ambient humidity, comprising:
a heat exchanger (10) comprising an inlet opening (14), an outlet opening (15), a forward direction of an airflow comprising ambient humidity being defined between said inlet opening (14) and said outlet opening (15), a plurality of desiccating zones (10a, 10b, 10c, 10d) arranged in succession in said forward direction of said airflow and comprising respective desiccating elements (11), each comprising a respective desiccant (11a') for extracting water from ambient air, the desiccating elements of each desiccating zone being arranged staggered with respect to the desiccating elements of the desiccating zones adjacent thereto, to divert the airflow comprising ambient humidity with respect to said forward direction; and a solar thermal panel (30) for giving up heat to said heat exchanger (10), wherein said solar thermal panel (30) is a concentrated solar thermal panel.

2. The apparatus for producing water (1) according to claim 1, wherein said heat exchanger (10) further comprises at least one coil (12) that circulates a heat-transfer fluid in order to heat a desiccant of said respective desiccants (11a′).

3. The apparatus for producing water (1) according to claim 1, wherein each desiccating zone of said plurality of desiccating zones has a number of desiccating elements (11) such that the number of desiccating elements increases in the direction of said airflow.

4. A heat exchanger (10) for use in an apparatus for producing water (1) according to claim 1, the heat exchanger comprising at least one coil (12) adapted to allow circulation of a heat-transfer fluid, and at least one desiccating element (11) comprising a desiccant (11a′) of said respective desiccants associated with said at least one coil (12), said at least one coil (12) being designed to heat said desiccant (11a′) through the circulation of the heat-transfer fluid.

5. The heat exchanger (10) according to claim 4, wherein at least one desiccant (11a′) comprises silica gel.

6. The heat exchanger (10) according to claim 4 wherein said at least one coil (12) defines an element for supporting said at least one desiccating element (11).

7. The heat exchanger (10) according to claim 4, wherein said at least one desiccating element (11) comprises a non-woven fabric container that is provided to contain an associated desiccant (11a′) of said respective desiccants.

8. An apparatus for producing water (1) from ambient humidity comprising:
a first heat exchanger (10) and a second heat exchanger (110), the first heat exchanger (10) and the second heat exchanger (110) each comprising a desiccant (11a′) for extracting water from ambient air,
a concentrated solar thermal panel (30) for giving up heat to said first heat exchanger or said second heat exchanger; and
an ejector (170) that is fluid-dynamically connected between and to said first heat exchanger and said second heat exchanger (10, 110) such that, whilst the first heat exchanger (10) or the second heat exchanger (110) produces aqueous vapor, said aqueous vapor passes inside a main duct of said ejector (170) in the form of a motor flow, thereby producing a depression in said second heat exchanger or said first heat exchanger (110, 10), respectively.

9. An apparatus for producing water (1) from ambient humidity, comprising:
a heat exchanger (10) comprising at least one coil (12) adapted to allow circulation of a heat-transfer fluid, and a plurality of desiccating elements (11), each comprising a respective desiccant (11a′), for extracting water from ambient air, each desiccating element being associated with a coil of the at least one coil (12), said at least one coil (12) being configured to heat said desiccant (11a′) through the circulation of the heat-transfer fluid,
a concentrated solar thermal panel (30) for giving up heat to said heat exchanger (10),
an inlet opening (14),
an outlet opening (15),
a forward direction of an airflow comprising ambient humidity being defined between said inlet opening (14) and said outlet opening (15), and
a plurality of desiccating zones (10a, 10b, 10c, 10d) that are arranged in succession in said forward direction of said airflow and comprise respective desiccating elements (11), of said plurality of said desiccating elements,
the desiccating elements of a respective desiccating zone being arranged staggered with respect to the desiccating elements of desiccating zones adjacent thereto, to divert the airflow comprising ambient humidity with respect to said forward direction.

10. The heat exchanger according to claim 9, wherein each desiccating zone of said plurality of desiccating zones has a number of desiccating elements (11) such that the number of desiccating elements increases in the direction of said airflow.

11. The heat exchanger (10) according to claim 9, wherein the plurality of desiccating elements includes first desiccating elements (11a′) and second desiccating elements (11b′), said second desiccating elements (11b′) being arranged in a second desiccating zone (10b) of said plurality of desiccating zones (10a, 10b, 10c, 10d) 10d) and housed in cascade with said first desiccating elements (11a′) arranged in a first desiccating zone (10a) of said plurality of desiccating zones (10a, 10b, 10c, 10d) with respect to said airflow.

* * * * *